Jan. 26, 1926.  1,571,085

C. BRAHS

LINING FOR TRANSMISSION AND BRAKE BANDS

Filed May 11, 1925

WITNESSES

INVENTOR
Chas. Brahs
BY
ATTORNEYS

Patented Jan. 26, 1926.

1,571,085

UNITED STATES PATENT OFFICE.

CHARLES BRAHS, OF PATERSON, NEW JERSEY.

LINING FOR TRANSMISSION AND BRAKE BANDS.

Application filed May 11, 1925. Serial No. 29,515.

*To all whom it may concern:*

Be it known that I, CHARLES BRAHS, a citizen of the United States of America, and resident of Paterson, in the county of Passaic and State of New Jersey, have invented a new and Improved Lining for Transmission and Brake Bands, of which the following is a full, clear, and exact description.

This invention relates to woven fabrics and has particular reference to a woven fabric for use as a lining for transmission or brake bands.

One of the outstanding objects of the present invention is to provide a woven or textile fabric for use as a transmission or brake band lining which is so constructed as to provide on the face which coacts with the transmission or brake drum means for preventing the glazing of the face whereby to cause the same to hold and thus increase the length of life and usefulness of the lining to a marked degree.

The invention furthermore comprehends a woven or textile fabric lining for transmission or brake bands which is constructed in such a manner as to provide pile threads extending through the thickness of the lining to constitute means for conveying oil to the active surface.

More specifically the invention comprehends in connection with a multiple interwoven ply fabric or textile lining for transmission and brake bands, pile warp threads extending through the thickness thereof to provide means for precluding the glazing of the active surface of the lining and further to provide means for conveying oil from the outer inactive surface to the inner active surface thereof.

The invention furthermore comprehends an improved woven or textile lining for the purpose specified which does not materially increase the cost of manufacture, which is comparatively simple and which is highly efficient in its purpose.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1:
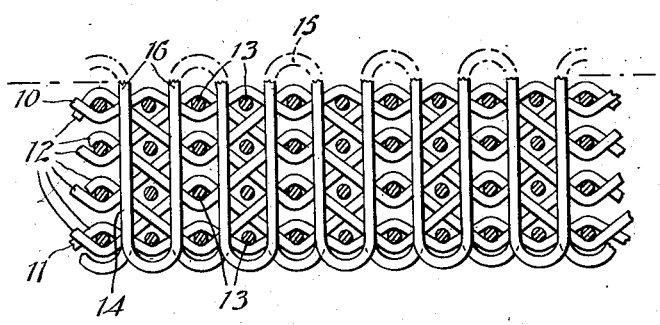
Figure 1 is a fragmentary longitudinal sectional view through a woven or textile lining constructed in accordance with the invention, parts being shown in broken lines to illustrate the method of making the same.
Figure 2:
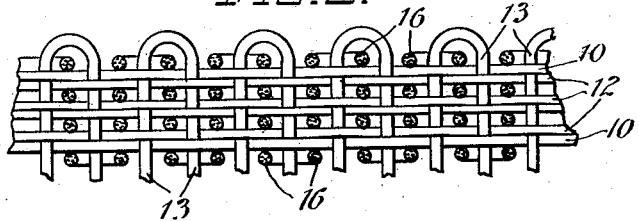
Fig. 2 is a fragmentary plan view of the lining.
Figure 3:
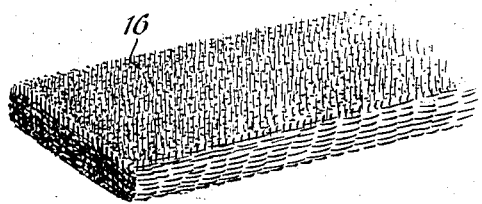
Fig. 3 is a perspective view of a portion of the lining.

Referring to the drawings by characters of reference 10 and 11 designate the outermost warp threads and 12 the intermediate interwoven or interlocked warp threads. 13 designates the weft threads with which the warp threads 10, 11 and 12 are interwoven to produce a multiple interwoven ply fabric or textile. The present invention consists in weaving a certain number of warp threads 14 to extend vertically throughout the thickness of the multiple ply fabric and cutting off the bight portions 15 illustrated in broken lines in Fig. 1, substantially flush or even with the active surface of the fabric so that in effect a plurality of pile warp threads 16 are provided on the active face for the purpose of preventing glazing thereof in addition to constituting wicks for conveying through the thickness of the fabric from its opposite inactive face quantities of oil which are to be fed to the active face. Under this arrangement the pile warps 16 which are presented endwise to the transmission or brake drums constitute in effect a nap which counteracts the glazing action on the active face of the body of the material.

The invention furthermore comprehends a method of producing a fabric of this class with pile warps extending through the thickness thereof which consists in alternately raising and lowering certain of the warp threads above and below the confines of the thickness of the fabric body, and inserting between the looped connecting portions of the pile warps means for preventing the drawing of the same flush with one face of the fabric body whereby upwardly projecting bights 15 are formed and then subsequently cutting the bights off flush with said face of the body of the fabric.

I claim:

1. As a new article of manufacture, a lining for transmission bands, brake bands and the like comprising a woven fabric body and pile warp threads extending therethrough at an angle to the weave of the fabric.

2. As a new article of manufacture, a lining for transmission bands, brake bands and the like comprising a woven fabric body and pile warp threads woven therethrough at a right angle to the weave of the fabric.

3. As a new article of manufacture, a lining for transmission bands, brake bands and the like comprising an interwoven multiple ply fabric body and pile warp threads woven and extending through said body at a right angle to the weave of the same.

4. As a new article of manufacture, a lining for transmission bands, brake bands and the like comprising an interwoven multiple ply fabric body and pile warp threads woven and extending through said body at a right angle to the weave of the same, the looped ends of said pile warp threads on one face of the body being cut off flush therewith to constitute means for preventing glazing of said face and serving as wicks for conveying oil through the body to the active face.

5. In a lining for transmission bands, brake bands and the like, an interwoven multiple ply fabric body and threads extending therethrough at right angles to the weave having severed ends presenting their cross sections to the active face of the lining for preventing glazing thereof.

6. In a lining for transmission bands, brake bands and the like, an interwoven multiply ply fabric body and threads extending therethrough at right angles to the weave having severed ends presenting their cross sections to the active face of the lining for preventing glazing thereof, and for conveying lubricant through the body to said active face from the opposite face.

7. As a new article of manufacture, a lining for transmission bands, brake bands and the like comprising a woven fabric body and a plurality of substantially U-shaped pile warp threads having the legs thereof respectively woven and extending through the body between the adjacent weft threads and between the warp threads thereof as and for the purpose specified.

8. The herein described method of producing woven fabric linings for transmission bands, brake bands or the like consisting in weaving through the thickness thereof pile warp threads and cutting off the looped connecting portions of said pile warp threads flush with one of the faces of the lining body.

9. The herein described method of producing woven fabric linings for transmission bands, brake bands or the like consisting in alternately raising and lowering certain of the warp threads above and below the upper and lower faces of the body, maintaining the looped connecting portions of the pile warp threads on one of the faces of the fabric above said face and then cutting off said looped connecting portions flush with said face of the fabric.

CHARLES BRAHS.